Oct. 21, 1952     H. C. RIEMANN     2,614,628
VEHICLE WINDSHIELD VISOR
Filed Aug. 30, 1950     3 Sheets-Sheet 1
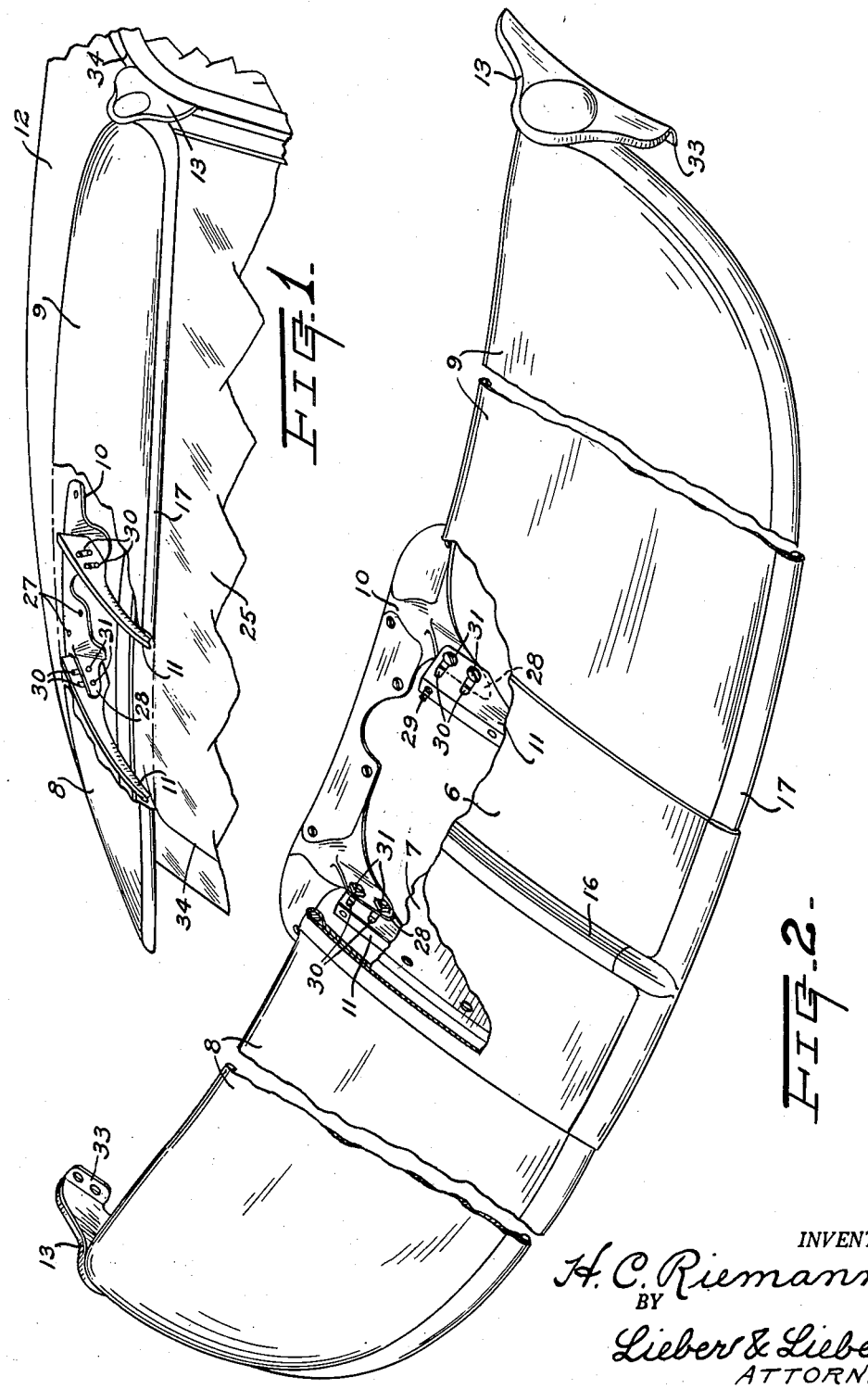
INVENTOR.
H. C. Riemann
BY
Lieber & Lieber
ATTORNEYS.

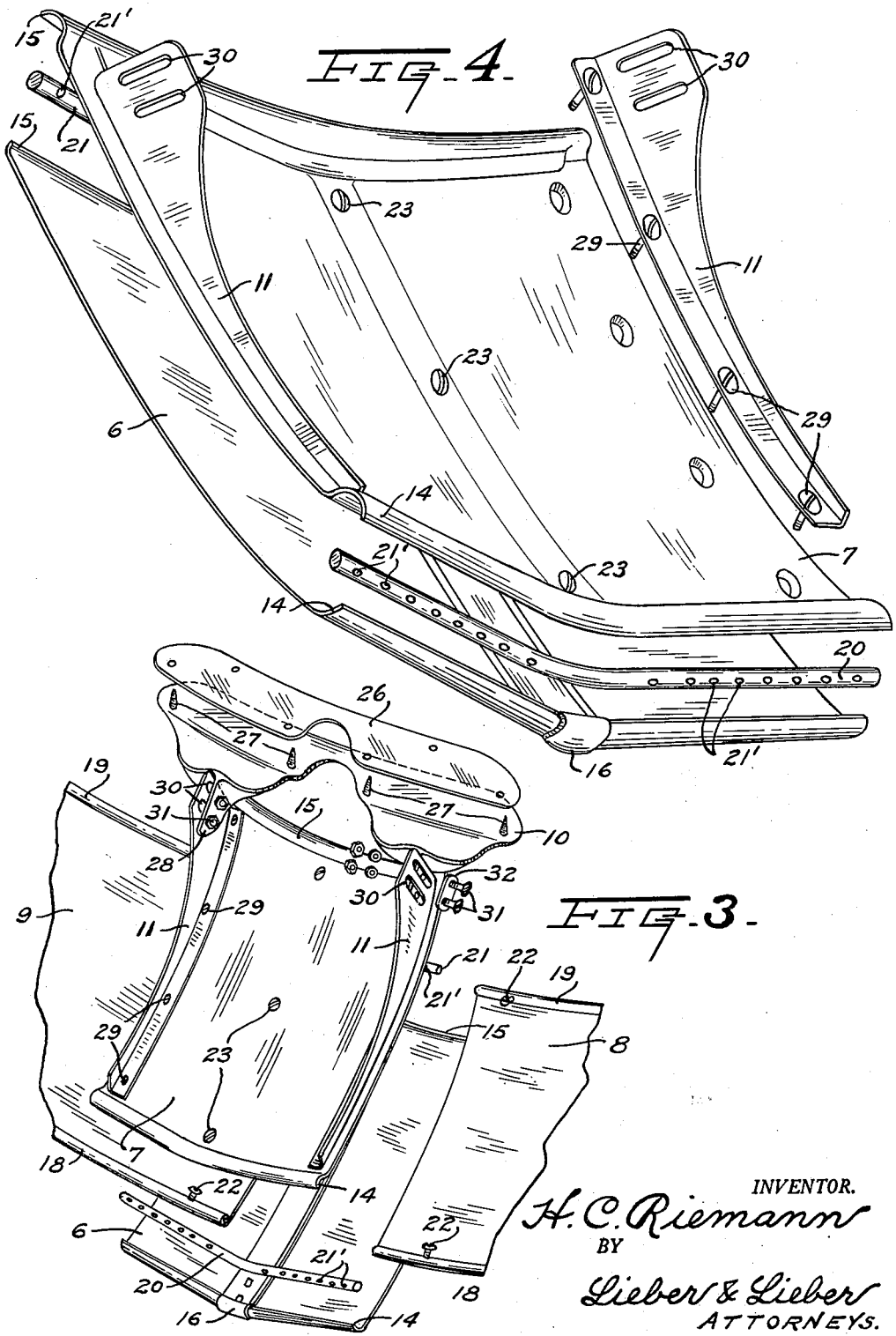

Oct. 21, 1952  H. C. RIEMANN  2,614,628
VEHICLE WINDSHIELD VISOR
Filed Aug. 30, 1950  3 Sheets-Sheet 3
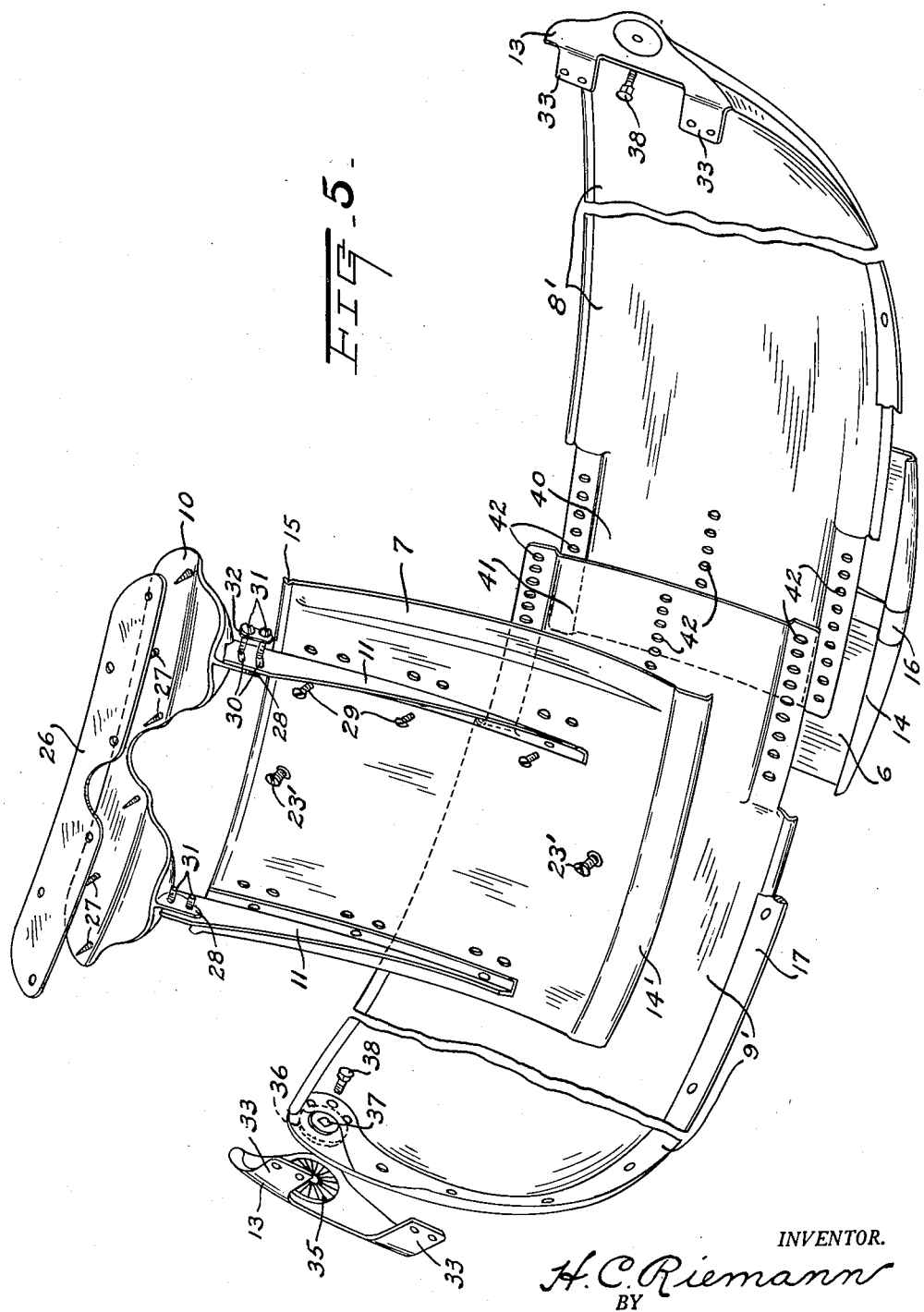
INVENTOR.
H. C. Riemann
BY
Lieber & Lieber
ATTORNEYS Patented Oct. 21, 1952

2,614,628

UNITED STATES PATENT OFFICE 2,614,628

VEHICLE WINDSHIELD VISOR

Howard C. Riemann, Milwaukee, Wis., assignor to The Fulton Company, West Allis, Wis., a corporation of Wisconsin Application August 30, 1950, Serial No. 182,238

3 Claims. (Cl. 160—211)

The present invention relates generally to improvements in accessories for enhancing the safety and comfort of the operators and other occupants of vehicles, and relates more specifically to improvements in the construction and operation of outside visors for motor vehicles of the type having clear vision windshields spanning the front portions of their enclosures.

Numerous socalled windshield visors for enclosed automobiles have heretofore been proposed and used extensively, and since these accessories are subjected to considerable pressure tending to tear them from their mounting especially when the vehicles are advancing at high speed, they are usually provided with sturdy opposite end brackets and with central supporting struts all firmly secured to the vehicle body. The end brackets can be readily attached to the automobile body so as to permit variation in the inclination of these visors, and in cases where the windshield is provided with a rigid central dividing strip it is an easy matter to connect the forward mid-portion of the horizontally elongated visor shield to the stiff windshield dividing strip with the aid of strut having a lower clamp adjustably cooperable with the divider, as in the Atkinson Patent No. 2,334,856, granted November 23, 1943.

However, in the more modern and streamlined automobiles the transparent windshield is formed as a unitary or one-piece elongated unobstructed pane stretching entirely across the front of the car body and longitudinally curved so as to provide extensive lateral vision, and in these vehicles the prior attaching struts cannot be utilized unless they are clamped to the car body beneath the windshield. This mode of supporting the mid-portion of the windshield visor panel is objectionable because it places a view obstruction across the windshield in the line of vision, so that the only alternative is to provide some means for centrally supporting the visor from the vehicle body above the windshield. Since the visor panel should preferably be longitudinally, laterally and swingably adjustable in order to properly fit various types of vehicles and to accommodate drivers of diverse height, and because the panel should also be curved fore and aft, it is exceedingly difficult to effectively anchor the medial visor portion to the vehicle body in accessories for modern automobiles in a manner whereby firm and permanent attachment is assured.

It is therefore an important object of my present invention to provide an improved mounting for the windshield panel of a visor adapted for coaction with an elongated windshield pane in a manner whereby the vision through the windshield remains entirely free from obstruction from mounting elements for the visor panel.

Another important object of the invention is to provide a simple outside visor unit for the windshield of an enclosed vehicle, which is longitudinally, laterally and angularly adjustable to cooperate with horizontally elongated unitary windshield panes without interfering with the forward view of the driver or other occupants of the vehicle.

A further important object of this invention is to provide an improved external visor accessory for modern streamlined automobiles having transversely curved and sloping one-piece windshields, whereby the visor panel is effectively supported only from its opposite ends and entirely above the mid-portion of the windshield pane, while still being universally adjustable to fit various styles of vehicles and to meet diverse conditions of use.

Still another important object of the present invention is to provide an attractive streamlined automobile visor comprising a rigid mid-section firmly but pivotally adjustably associable with the vehicle body entirely above the windshield, and a pair of curved and relatively flexible opposite end panel sections adjustably secured at their adjacent inner ends to the opposite sides of the mid-section while their remote outer ends are likewise firmly but adjustably secured to the body of the vehicle at the outer ends of the windshield.

Additional object of the invention is to provide a simple but durable and highly aesthetic vehicle windshield visor which is exceptionally flexible in its adaptations to various types of automobiles, and which can be manufactured at moderate cost and readily applied to vehicles by a novice.

These and other objects and advantages of my present invention will be apparent from the following detailed description.

A clear conception of the features constituting the present improvements, and of the construction and operation of several typical commercial embodiments thereof, may be had by referring to the drawings accompanying and forming a part of this specification wherein like reference characters designate the same or similar parts in the various views.

Fig. 1 is a somewhat diagrammatic front and side perspective view showing one of my improved visors attached to a fragment of an automobile;

Fig. 2 is an enlarged fragmentary top and side perspective of a typical vehicle windshield visor embodying the invention, a portion of the rigid medial section of the visor panel having been broken away so as to reveal the normally concealed central support;

Fig. 3 is a fragmentary exploded bottom and side perspective view of the medial portion of a visor assemblage similar to that shown in Fig. 2, utilizing rods for effecting adjustment of the panel;

Fig. 4 is a further enlarged exploded bottom and side perspective view of the mid-portion of the visor assemblage of Fig. 3 but with the end panel sections omitted; and Fig. 5 is a fragmentary exploded bottom and end perspective view of another type of visor assemblage similar to that shown in Fig. 2, showing an improved end bracket for these windshield visors, and also showing a modified form of panel adjustment.

The gist of my present invention is the provision of a windshield visor having an elongated transversely and longitudinally curved rigid panel formed of a stiff mid-section and relatively resilient end sections the adjacent ends of which are adjustably secured to the opposite sides of the mid-section, the rear edge of the mid-section and the outer ends of the two end sections being swingably adjustably mounted directly upon the vehicle body or enclosure rearwardly of the windshield pane; and while only two specific embodiments of the improvement have been shown by way of illustration, it is not my desire or intent to unnecessarily restrict the invention by virtue of this limited showing. It is furthermore contemplated that specific descriptive terms employed herein be given the broadest possible interpretation consistent with the actual disclosure.

Referring to Figs. 1, 2, 3, and 4 of the drawings, the improved vehicle windshield visor accessory shown therein, comprises in general, a mid-section composed of a stiff top plate 6 and a stiff bottom plate 7; a pair of relatively resilient longitudinally and transversely curved end sections 8, 9 having their inner ends adjustably secured to the opposite sides of the plates 6, 7; a central hinge bracket composed of a base portion 10 and swinging portions 11 for pivotally connecting the rear uppermost edges of the plates 6, 7 with the vehicle body 12 above the mid-portion of the windshield; and opposite end brackets 13 for swingably adjustably mounting the outer ends of the two panel sections 8, 9 upon the vehicle body outwardly beyond the opposite ends of the transparent windshield.

The visor mid-section plates 6, 7 are both formed of relatively heavy sheet metal and are curved fore and aft, and both the front and rear edges of these plates are provided with stiffening flanges or beads 14, 15 respectively, while the top plate 6 may be additionally reenforced by an attractive center strip 16. The two end sections 8, 9 of the visor panel may be formed of thinner and more resilient or flexible sheet metal so as to permit slight distortion thereof to conform with the shapes of various types of vehicle bodies when the visor assemblage is being attached and adjusted and all of the visor panel sections may also be provided with a decorative nosing strip 17 as shown in Figs. 1 and 2.

Each of the end sections 8, 9 is curved both longitudinally and fore and aft, and in the embodiment shown in Figs. 3 and 4, is also provided with front and rear integral tubular edge beads 18, 19 adapted to be telescopically adjusted and confined and thereafter clamped between the beads 14, 15 of the plates 6, 7 and to snugly receive the adjacent ends of front and rear angular rods 20, 21 respectively each having a series of selectively spaced tapped holes 21' therein. These rods 20, 21 may be inserted snugly within the panel section beads 18, 19 any desired distance in order to vary the overall length of the visor, and they may then be firmly attached to the panel end sections 8, 9 by means of screws 22; and the center plates may be subsequently clamped against the ends of the sections 8, 9 by other screws 23 so as to completely conceal the rods 20, 21. The composite visor panel may thus be accurately adjusted for variation in overall length and fitted to the bodies of various types of automobiles having either plane or curved transparent front windshields, and the rods 20, 21 may be slightly bent while the flexible panels 8, 9 may be slightly distorted in order to insure proper fits.

The base portion 10 and the swingable portions 11 of the central hinge bracket, are also formed of durable sheet metal, and the base portion 10 is adapted to be firmly attached to the metal vehicle body 13 centrally above the transparent windshield pane 25 over a gasket 26, with the aid of screws 27 as illustrated in Figs. 1 and 3. This base portion 10 is provided with parallel forwardly and downwardly directed integral ears 28, and the two swingable bracket portions 11 which are fixedly attached to the lower or bottom plate 7 of the central visor section by screw bolts 29 are each provided with a pair of slots 30 and are swingably adjustably attachable to the ears 28 at these slots by means of other screw bolts 31 preferably coacting with links 32 as shown in Figs. 3 and 4. This formation of the central hinge bracket permits the mid-portion of the visor to be adjusted to any desired angle relative to the windshield 25 and to be firmly clamped in adjusted position.

The two opposite end brackets 13 of the visor assemblage are of similar construction and may be formed of durable sheet metal, preferably as shown in Fig. 5. Each bracket 13 has inwardly extending flanges 33 adapted to be fastened to the vehicle body 12 within the front and side door opening 34 as depicted in Fig. 1, and each bracket 13 is provided with a gear plate 35 having radial teeth or serrations adapted to intermesh with similar teeth on an axially alined gear plate 36 rigidly secured to the extreme end of the adjacent end panel section 8, 9. Each gear plate 36 has a square or otherwise polygonal central hole 37 therein, and a stove bolt 38 is adapted to be inserted through this hole 38 so as to clamp the two plates 35, 36 together, so that the radially coacting teeth obviously permit these plates to be clamped in various angular positions about the axes of the holes 37 in order to adjustably vary the inclination of the visor end panels 8, 9 to conform with the mid-section.

The modified visor of Fig. 5 is quite similar to the structure of Figs. 3 and 4, except as to the formation of the inner or adjacent ends of the panel sections 8', 9', and the mode of attaching these sections to each other and to the top and bottom plates 6, 7 of the mid-section. In this modification the adjacent end portions 40, 41 of the panel sections 8', 9' are each provided with two outer series and with an intermediate series of alignable similarly spaced openings 42 and are adapted to be interconnected by bolts 23' passed through alined openings 42 of the outer series and by a central stud secured to the strip 16 and passing through alined openings 42 of the intermediate series after proper adjustment of the several visor elements has been effected. By thus directly interconnecting the panel sections 8', 9', with each other and to the plates 6, 7 of the central panel section a more rigid visor panel results, and the end sections may be readily adjusted to vary both the length of the visor and the relative angularity of the sections 8', 9', but the outer edge of the lower plate 7 is preferably provided with a special bead 14' cooperable with the bead 14 of the top plate 6 so as to conceal the adjusting openings.

When these improved outside windshield visors have been properly constructed and assembled as herein described, they may be readily applied to various types of vehicles having either one-piece or sectional curved or plane windshields 25 so as to resist any pressures due to normal driving. In either case, the overall length of the visor panel may be conveniently varied to cooperate with windshields 25 of diverse widths, and the angularity of the end panel sections may also be adjusted relative to the mid-section plates 6, 7 in accordance with varying shapes of windshield panes. These adjustments should be made before the visor panel is applied to the vehicle body 12.

After the panel assemblage has been properly assembled and shaped to fit the particular vehicle, and the central bracket portions 11 and end mounting brackets 13 have been affixed thereto, the mid-portion 10 of the upper central bracket portion 10 should be firmly attached to the body 12 above the windshield 25 by means of the special screws 27, the gasket 26 being used merely in order to prevent marring the body finish. The several bracket portions 10, 11 should then be interconnected at the slots 30 by means of the bolts 31, and after the fixed portions of the end brackets 13 have been firmly attached to the body 12 either within the side door opening 34 or otherwise, the pivot bolts 38 may be applied to the holes 37 to pivotally interconnect the serrated gear plates 35, 36 of the end brackets.

Following such initial application of the visor assemblage to the vehicle, and while the bolts 31, 38 are in loosened condition, the visor panel may be swung up or down so as to vary its inclination to conform with the desires of the driver, and when proper adjustment has been made these pivot bolts 31, 38 may be manipulated to firmly clamp the visor in adjusted inclined position. During such final clamping, the teeth of the adjacent gear plates 35, 36 will interlock and the bolts 31 will cooperate with the links 32 and slots 30 of the adjacent bracket portions 11 to rigidly mount the visor and to hold it against displacement due to pressures created thereon during transportation of the vehicle at any speed.

From the foregoing detailed description of the construction and application of the improved outside windshield visor, it should be apparent that I have in fact provided an assemblage which may be applied to various types of vehicle windshields and universally adjusted to meet varying shapes and conditions. The improved visor mounting is simple but sturdy and while it is especially adapted for use in cooperation with unitary transparent windshields 25, it may also be applied to sectional windshield panes without introducing any vision obstructions due to panel mountings. The rigid medial panel section coacts with the adjacent ends of the flexible end sections to firmly unite the latter and to conceal and protect the fastening elements; while the flexibility of the end sections aids in obtaining a perfect fit between the visor assembly and the vehicle body 12.

While the assemblage of Figs. 3 and 4 is satisfactory, a sturdier structure results from the use of end panel sections 8', 9' as in Fig. 5 wherein the ends 40, 41 of the latter overlap and are clamped directly to each other between the mid-section plates 6, 7. The adjusting holes 42 may also be formed slightly elliptical in order to facilitate relative angular adjustment of the end panels with respect to the mid-section, but the important feature of the invention is the provision of a universally adjustable outside windshield visor which may be rigidly attached to the vehicle without in any manner obstructing the view through the windshield pane due to visor mountings. In both embodiments of the invention the opposite panel end sections have their adjacent ends telescopically confined and clamped between the edges of the upper and lower plates so as to facilitate variation of the overall panel length for proper cooperation with vehicles of various widths. The invention has gone into successful commercial use, and the improved visors present a neat and highly aesthetic appearance and may be easily applied with ordinary tools.

It should be understod that it is not desired to limit this invention to the exact details of construction and to the precise mode of assembly and application of the visors herein specifically shown and described, for various modifications within the scope of the appended claims may occur to persons skilled in the art.

I claim:

1. In a vehicle windshield visor, an elongated panel formed of a rigid mid-section having upper and lower plates and opposite end sections having adjacent ends telescopically confined and clamped between said plates to facilitate variation of the overall panel length, said plates being relatively wide transversely of the vehicle and said lower plate having a rigid bracket depending from each of its opposite ends, an elongated hinge bracket attachable to the vehicle entirely above the windshield and having spaced flanges swingably adjustably attachable to said depending plate brackets, and means for likewise swingably adjustably mounting the extreme end of each end panel section remote from the mid-section upon the vehicle beyond an end of the windshield.

2. In a vehicle windshield visor, an elongated laterally and longitudinally curved panel formed of a rigid mid-section having upper and lower plates and opposite more flexible end sections having adjacent ends telescopically confined and clamped between said plates to facilitate variation in the overall panel length, said plates being relatively wide and having cooperating lower and upper edge portions forming elongated tubular spaces normally confining the associated edges of said end sections and said lower plate having a rigid bracket depending from each of its opposite ends, means within said tubular spaces for fastening said end panel sections in various positions of adjustment, an elongated hinge bracket attachable to the vehicle entirely above the windshield and having spaced rigid flanges swingably adjustably attachable to said depending plate brackets, and means for likewise swingably adjustably mounting the extreme end of each end panel section remote from said mid-section upon the vehicle beyond an end of the windshield.

3. In a vehicle windshield visor, an elongated laterally and longitudinally curved panel formed of a rigid mid-section having upper and lower plates and opposite more flexible end sections having adjacent ends telescopically confined and clamped between said plates to facilitate variation in the overall panel length, said plates being relatively wide transversely of the vehicle and said lower plate having a rigid bracket depending from each of its opposite ends, an elongated hinge bracket attachable to the vehicle entirely above the windshield and having spaced rigid flanges disposed between and swingably adjustably attachable to said depending plate brackets, and means for likewise swingably adjustably mounting the end of each end panel section remote from said mid-section upon the vehicle beyond an end of the windshield.

HOWARD C. RIEMANN.

REFERENCES CITED

The following references are of record in the file of this patent:

UNITED STATES PATENTS

| Number | Name | Date |
|---|---|---|
| 1,615,079 | Grigsby | Jan. 18, 1927 |
| 2,334,856 | Atkinson | Nov. 23, 1943 |
| 2,527,247 | Dieterich | Oct. 24, 1950 |
| 2,548,068 | Rountree et al. | Apr. 10, 1951 |